United States Patent [19]
Howard

[11] Patent Number: 6,070,431
[45] Date of Patent: Jun. 6, 2000

[54] DISTILLATION SYSTEM FOR PRODUCING CARBON DIOXIDE

[75] Inventor: Henry Edward Howard, Grand Island, N.Y.

[73] Assignee: Praxair Technology, Inc., Danbury, Conn.

[21] Appl. No.: 09/241,616

[22] Filed: Feb. 2, 1999

[51] Int. Cl.[7] .................................................. F25J 3/02
[52] U.S. Cl. ........................................ 62/620; 62/929
[58] Field of Search ................................. 62/620, 929

[56] References Cited

U.S. PATENT DOCUMENTS

| | | | |
|---|---|---|---|
| 2,632,316 | 3/1953 | Du Bois Eastman | 62/175.5 |
| 3,983,711 | 10/1976 | Solomon | 62/28 |
| 4,152,129 | 5/1979 | Trentham et al. | 62/18 |
| 4,441,900 | 4/1984 | Swallow | 62/29 |
| 4,514,203 | 4/1985 | Gazzi et al. | 62/17 |
| 4,595,404 | 6/1986 | Ozero et al. | 62/18 |
| 4,759,786 | 7/1988 | Atkinson et al. | 62/929 |
| 4,762,543 | 9/1988 | Pantermuehl et al. | 62/929 |

*Primary Examiner*—Ronald Capossela
*Attorney, Agent, or Firm*—Stanley Ktorides

[57] ABSTRACT

A distillation system for producing carbon dioxide, particularly from a feed which contains significant levels of light components, wherein the feed is at least partially condensed upstream of the distillation by indirect heat exchange with a multicomponent heat exchange fluid recirculating in a closed refrigeration loop, and/or the overhead from the distillation is condensed for reflux by indirect heat exchange with a multicomponent heat exchange fluid recirculating in a closed refrigeration loop.

10 Claims, 1 Drawing Sheet

DISTILLATION SYSTEM FOR PRODUCING CARBON DIOXIDE

TECHNICAL FIELD

This invention relates generally to distillation for the production of carbon dioxide.

BACKGROUND ART

Carbon dioxide has a large number of uses. For example, carbon dioxide is used to carbonate beverages, to chill, freeze and package seafood, meat, poultry, baked goods, fruits and vegetables, and to extend the shelf-life of dairy products. It is an important environmental component in industrial waste and process water treatment as a replacement for sulfuric acid to control pH levels. Other uses included drinking water treatment, an environmentally-friendly pesticide and an atmosphere additive in greenhouses to improve the growth of vegetables.

Generally carbon dioxide is produced by purifying a waste stream which is a by-product of an organic or inorganic chemical process. The waste stream comprising the carbon dioxide is condensed and then processed in a distillation column to produce the product grade carbon dioxide.

As the demand for carbon dioxide continues to increase, more marginal sources of carbon dioxide are being used to supply the crude carbon dioxide feed to the purification system. Such marginal feeds may include significant amounts of light contaminants and thus require significantly more energy to carry out the requisite liquefaction prior to the distillation into product.

Accordingly it is an object of this invention to provide a system which can effectively process a crude carbon dioxide feed stream which contains light contaminants in a more energy efficient manner than that possible with conventional carbon dioxide processing systems.

SUMMARY OF THE INVENTION

The above and other objects, which will become apparent to one skilled in the art upon a reading of this disclosure, are attained by the present invention, one aspect of which is:

A method for producing carbon dioxide comprising:

(A) passing a feed comprising carbon dioxide and light contaminants into a column;

(B) separating the feed within the column into light overhead and carbon dioxide product;

(C) partially condensing light overhead by indirect heat exchange with multicomponent heat exchange fluid to produce reflux liquid and remaining contaminant vapor;

(D) passing reflux liquid down the column; and (E) recovering carbon dioxide product from the lower portion of the column.

Another aspect of the invention is:

A method for producing carbon dioxide comprising:

(A) providing a feed comprising carbon dioxide and light contaminants;

(B) cooling the feed to produce a cooled feed;

(C) at least partially condensing the cooled feed by indirect heat exchange with a multicomponent heat exchange fluid, and passing the resulting feed into a column;

(D) separating the feed within the column into light overhead and carbon dioxide product; and (E) recovering carbon dioxide product from the lower portion of the column.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook fifth edition, edited by R. H. Perry and C. H. Chilton, McGraw-Hill Book Company, New York, Section 13, *The Continuous Distillation Process*.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is generally adiabatic and can include integral (stagewise) or differential (continuous) contact between the phases. Separation process arrangements that utilize the principles of rectification to separate mixtures are often interchangeably termed rectification columns, distillation columns, or fractionation columns.

As used herein, the terms "upper portion" and "lower portion" mean those sections of a column respectively above and below the mid point of the column.

As used herein, the term "indirect heat exchange" means the bringing of two fluids into heat exchange relation without any physical contact or intermixing of the fluids with each other.

As used herein, the term "condenser" means an indirect heat exchanger wherein a feed comprising carbon dioxide and light contaminants is at least partially condensed.

As used herein, the term "light contaminants" means one or more species having a vapor pressure greater than that of carbon dioxide. Examples of light contaminants include nitrogen, oxygen, argon, hydrogen and carbon monoxide.

As used herein, the term "multicomponent heat exchange fluid" means a fluid having two or more components which possess different saturation curves (boiling points).

A multicomponent heat exchange fluid is a heat transfer fluid having at least two components. Streams which partially condense over a range of temperatures are more efficiently condensed using certain multicomponent heat exchange fluids which are designed to closely follow the condensation heat transfer curve (Q vs T) by proper selection of components, composition and operating pressure. The proper multicomponent heat exchange fluid minimizes process lost work by reducing the temperature difference between the cooling condensing stream relative to the vaporizing multicomponent heat exchange fluid through the partial condensation heat exchanger.

As used herein, the term "subcooling" means cooling a liquid to be at a temperature lower than that liquid's saturation temperature for the existing pressure.

As used herein, the terms "turboexpansion" and "turboexpander" mean respectively method and apparatus for the flow of high pressure gas through a turbine to reduce the pressure and the temperature of the gas thereby generating refrigeration.

Figures 1, 2:
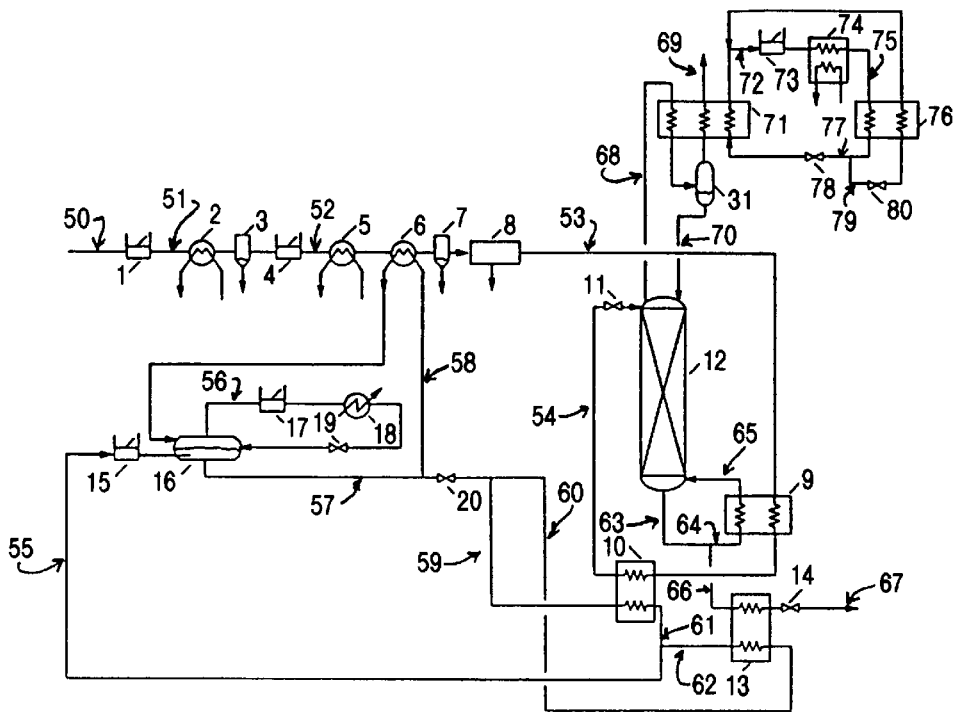
FIG. 1 is a schematic representation of one preferred embodiment of the invention.
FIG. 2 is a schematic representation of another preferred embodiment of the invention.

The numerals in the Drawings are the same for the common elements.

DETAILED DESCRIPTION

The invention comprises, in general, the use of a multicomponent heat exchange fluid recirculating in a heat exchange circuit, to partially liquefy overhead from the distillation column or to liquefy at least some, preferably all, of the feed to the column for the separation of carbon dioxide from light contaminants. The multicomponent heat exchange fluid enables the liquefaction to be carried out with less energy than would be needed if turboexpansion were used to generate refrigeration, or if a conventional pure component refrigerant were used to absorb the heat of condensation.

The invention will be described in detail with reference to the Drawings. Referring now to FIG. 1, feed stream 50 comprising carbon dioxide, light contaminants and water vapor, typically at about ambient pressure, is passed to compressor 1 wherein it is compressed to a pressure generally within the range of from 60 to 90 pounds per square inch absolute (psia). Feed stream 50 is typically taken from the waste effluent of an organic or inorganic chemical production system such as one which produces ethanol and/or other alcohols. The concentration of carbon dioxide in the feed is generally within the range of from 25 to 98 mole percent on a dry basis. The invention will have particular utility for processing a feed wherein the light contaminants comprise at least 15 mole percent on a dry basis.

Compressed feed 51 is cooled by passage through water or air driven cooler 2 and condensed moisture is separated in phase separator 3. The feed is then further compressed by passage through compressor 4 to a pressure generally within the range of from 280 to 325 psia. The further compressed feed 52 is then further cooled by passage through coolers 5 and 6. Condensed moisture is removed in phase separator 7 and the feed is further dried by passage through adsorbent bed 8.

Cooled, dried feed stream 53 is then cooled to near its dewpoint by passage through column reboiler 9 and then is provided by conduit to condenser 10 wherein it is at least partially condensed, preferably substantially totally condensed by indirect heat exchange with recirculating pure component heat exchange fluid. Preferably the pure component heat exchange fluid is ammonia. Other pure component heat exchange fluids which may be used in the practice of this invention include propane and halogenated hydrocarbon refrigerants. Resulting condensed feed 54 is flashed through valve 11 and passed into column 12, preferably, as illustrated in FIG. 1, at the top of column 12.

Referring back now to FIG. 1, gaseous heat exchange fluid 55 is compressed to a moderate pressure by passage through compressor 15 and then passed into direct contact aftercooler 16. Gaseous moderate pressure heat exchange fluid is withdrawn from aftercooler 16 in stream 56 and compressed to a high pressure in compressor 17. The high pressure fluid is then substantially totally condensed by passage through heat exchanger 18 by indirect heat exchange with, for example, water or air, and then passed through valve 19 and into aftercooler 16 as the cooling medium. Moderate pressure chilled liquid heat exchange fluid is withdrawn from aftercooler 16 in stream 57. If desired, as illustrated in FIG. 1, a portion 58 of stream 57 is passed through cooler 6 to cool the feed and then returned to aftercooler 16. The remaining portion of stream 57 is passed through valve 20 and is then divided into streams 59 and 60. Stream 59 is provided by conduit to condenser 10 wherein it is vaporized by indirect heat exchange with the aforesaid condensing feed, and resulting vaporized heat exchange fluid is withdrawn from condenser 10 as stream 61. Stream 60 is passed into subcooler 13 wherein it is vaporized by indirect heat exchange with subcooling product. Resulting vaporized stream 62 is combined with stream 61 to form gaseous stream 55 and the closed loop refrigeration cycle is repeated.

Column 12 is operating at a pressure generally within the range of from 250 to 320 psia. Within column 12 the feed is separated by distillation into light overhead and carbon dioxide product. The feed liquid flows down column 12 against upflowing vapor and light contaminants are stripped out of the downflowing liquid into the upflowing vapor to form the light overhead at the top of column 12 and the carbon dioxide product at the bottom of column 12.

Carbon dioxide product liquid, generally having a carbon dioxide concentration of at least 99.9 mole percent, is withdrawn from the lower portion of column 12 in stream 63. A portion 64 is vaporized by passage through reboiler 9 in indirect heat exchange with cooling feed, and resulting vaporized portion 65 is passed back into column 12 to serve as the upflowing vapor. Another portion 66 of stream 63 is subcooled by passage through subcooler 13, passed through valve 14 and recovered as product carbon dioxide in stream 67.

Light overhead vapor 68, containing an increased fraction of light contaminants from that in the feed, and also containing some carbon dioxide, is withdrawn from the upper portion of column 12, partially condensed by passage through heat exchanger 71, and passed into phase separator 31. Uncondensed remaining contaminant vapor is passed out of phase separator 31 in vapor stream 69 and warmed by passage through heat exchanger 71 prior to withdrawal from the system. Resulting reflux liquid is passed in stream 70 from phase separator 31 into the upper portion of column 12 and then down column 12.

Heat exchanger 71 is driven by a recirculating multicomponent heat exchange fluid which preferably is comprised of the refrigerant used to drive heat exchanger 10, e.g. ammonia, and a second colder boiling species, e.g. nitrogen. Other colder boiling species which may be used include argon, methane, ethane and refrigerants having the designations R14, R23, R32 and R125. Multicomponent heat exchange fluid 72 is compressed in compressor 73 and then cooled and preferably partially or totally condensed by passage through heat exchanger 74 by indirect heat exchange with a suitable cooling fluid such as water or forced air. Resulting fluid 75 is further condensed and/or subcooled by passage through heat exchanger 76 and then divided into two portions. The first portion 77 is reduced in pressure by passage through valve 78 and then passed through heat exchanger 71 to partially condense the light overhead vapor. The second portion 79 is reduced in pressure through valve 80 and then passed through heat exchanger 76 to condense and/or subcool multicomponent heat exchange fluid 75. Streams 77 and 79 are recombined to form stream 72 and the closed loop refrigeration cycle is repeated.

FIG. 2 illustrates another embodiment of the invention which is particularly useful for operation at a higher pressure. Those portions of the embodiment illustrated in FIG. 2 which are common with that illustrated in FIG. 1 will not be described again in detail. Referring now to FIG. 2, cooled feed from cooler 5 is passed into phase separator 7 and then further compressed to a pressure, generally within the range of from 600 to 1200 psia, by passage through compressor 107. Further compressed feed stream 81 is cooled by passage through cooler 108 and passed into phase separator 109 from which moisture is removed. Vapor 82 from phase separator 109 may undergo a number of other pretreatment steps, represented by element 110 to remove other high boiling or heavy contaminants such as hydrocarbons having two or three carbon atoms, and sulfur compounds such as hydrogen sulfide. Element 110 can include absorption, oxidation, and/or adsorption steps. Thereafter the feed is further dehydrated by passage through adsorbent bed 111. If desired, elements 110 and 111 may be placed directly after phase separator 7.

The cleaned feed 83 is cooled to near its dewpoint by passage through column reboiler 112 and then at least partially, and preferably substantially completely, condensed by passage through condenser 114. Resulting liquefied feed stream 84 is passed through valve 300 and into column 12 wherein it is processed in a manner similar to that described in conjunction with FIG. 1. In the embodiment illustrated in FIG. 2, column 12 may be operating at a pressure within the range of from 500 to 1000 psia.

The multicomponent heat exchange fluid useful in the practice of the embodiment of the invention illustrated in FIG. 2 is preferably a binary mixture. Species which may be used in the multicomponent heat exchange fluid of this invention include ammonia, carbon dioxide, nitrogen, argon, saturated hydrocarbons such as methane, ethane, propane and butane, and halogenated hydrocarbons. Preferably the multicomponent heat exchange fluid comprises ammonia. Most preferably the multicomponent heat exchange fluid is a binary mixture comprising ammonia and nitrogen, ammonia and ethane, or ammonia and a halogenated hydrocarbon.

Multicomponent gaseous heat exchange fluid 86 is compressed by passage through compressor 117 and cooled by passage through heat exchanger 118 by indirect heat exchange with a suitable coolant such as air or water. The resulting fluid 87 is further compressed by passage through compressor 119 and at least partially condensed by passage through cooler 120 by indirect heat exchange with a suitable coolant such as air or water. The resulting multicomponent heat exchange fluid 88 is then further condensed and/or subcooled by passage through reboiler 112 thereby supplying reboil to column 12. Resulting heat exchange fluid 89 from reboiler 112 is passed through a first pass of condenser 114 from which it exits as substantially all liquid. The multicomponent heat exchange fluid 90 is then expanded to a lower pressure through valve 121 and subsequently evaporated by passage through a second pass of condenser 114. By doing so, the evaporating multicomponent heat exchange fluid absorbs the heat duty required to cool and at least partially condense the feed, cool and condense the higher pressure multicomponent heat exchange fluid in the first pass of condenser 114, and also subcool the product carbon dioxide. The resulting evaporated heat exchange fluid 86 then passes to the inlet of compressor 117 and the closed loop refrigeration cycle is repeated.

Overhead vapor containing light contaminants is withdrawn from the upper portion of column 12 in stream 91, warmed by passage through condenser 114 and passed out of the system. Owing to the elevated pressure at which column 12 is operating, a portion, 92, of stream 91 may be turboexpanded by passage through turboexpander 116 to generate refrigeration with resulting turboexpanded stream 93 passed through condenser 114 and then out of the system. The shaft work of expansion may be used to generate electricity or for process compression.

Carbon dioxide product liquid, generally having a carbon dioxide concentration of at least 99.9 mole percent, is withdrawn from the lower portion of column 12 in stream 63. A portion 64 is vaporized by passage through reboiler 112 in indirect heat exchange with cooling feed and multicomponent heat exchange fluid, and resulting vaporized portion 65 is passed back into column 12 to serve as the upflowing vapor. Another portion 66 of stream 63 is subcooled by passage through condenser 114, passed through valve 14 and recovered as product carbon dioxide in stream 67.

Now with the use of this invention one can provide efficiently and effectively product grade carbon dioxide by cryogenic rectification from a feed containing significant levels of light contaminants. Although the invention has been described in detail with reference to certain preferred embodiments, those skilled in the art will recognize that there are other embodiments of the invention within the spirit and the scope of the claims.

What is claimed is:

1. A method for producing carbon dioxide comprising:

(A) passing a feed comprising carbon dioxide and light contaminants into a column;

(B) separating the feed within the column into light overhead and carbon dioxide product;

(C) partially condensing light overhead by indirect heat exchange with multicomponent heat exchange fluid to produce reflux liquid and remaining contaminant vapor;

(D) passing reflux liquid down the column; and (E) recovering carbon dioxide product from the lower portion of the column.

2. The method of claim 1 wherein the feed is condensed by indirect heat exchange with recirculating refrigerant prior to being passed into the column.

3. The method of claim 2 wherein the carbon dioxide product is subcooled by indirect heat exchange with the recirculating refrigerant.

4. The method of claim 1 wherein the multicomponent heat exchange fluid comprises ammonia and nitrogen.

5. A method for producing carbon dioxide comprising:

(A) providing a feed comprising carbon dioxide and light contaminants;

(B) cooling the feed to produce a cooled feed;

(C) at least partially condensing the cooled feed by indirect heat exchange with a multicomponent heat exchange fluid, and passing the resulting feed into a column;

(D) separating the feed within the column into light overhead and carbon dioxide product; and (E) recovering carbon dioxide product from the lower portion of the column.

6. The method of claim 5 wherein the cooling of the feed is carried out at least in part by indirect heat exchange with the multicomponent heat exchange fluid.

7. The method of claim 5 wherein the carbon dioxide product is subcooled by indirect heat exchange with the multicomponent heat exchange fluid.

8. The method of claim 5 wherein the multicomponent heat exchange fluid is a binary mixture.

9. The method of claim 5 wherein one of the components of the multicomponent heat exchange fluid is ammonia.

10. The method of claim 5 further comprising turboexpanding at least a portion of the light overhead and warming the turboexpanded light overhead by indirect heat exchange with said at least partially condensing cooled feed.

* * * * *